United States Patent [19]

Rogan et al.

[11] Patent Number: 5,221,436
[45] Date of Patent: Jun. 22, 1993

[54] PITCH CONTROL USING CLAY COATED WITH AN INORGANIC GEL

[75] Inventors: Keith R. Rogan; John M. Adams, both of Cornwall, United Kingdom

[73] Assignee: ECC International Limited, Great Britain

[21] Appl. No.: 618,589

[22] Filed: Nov. 28, 1990

Related U.S. Application Data

[63] Continuation of Ser. No. 373,911, Jun. 29, 1989, abandoned.

Foreign Application Priority Data

Jun. 29, 1988 [GB] United Kingdom ............... 8815515

[51] Int. Cl.$^5$ .............................................. C09C 1/42
[52] U.S. Cl. ................................. 162/199; 162/164.6; 162/168.2; 162/168.3; 162/181.6; 162/181.7; 162/181.8; 162/DIG. 4; 210/691; 210/692; 210/680
[58] Field of Search ............... 162/164.6, 168.3, 168.2, 162/181.1, 181.6, 181.7, 181.8, 199, DIG. 4; 210/691, 692, 679, 680

[56] References Cited

U.S. PATENT DOCUMENTS

| | | | |
|---|---|---|---|
| 2,795,545 | 6/1957 | Gluesenhamp | 162/168.5 |
| 2,885,366 | 5/1959 | Iler . | |
| 3,488,077 | 12/1969 | Aldrich | 162/181.8 |
| 3,711,573 | 1/1973 | Nagy | 162/168.3 |
| 3,801,433 | 4/1974 | Windle | 162/181.8 |
| 3,891,589 | 6/1975 | Ray-Chaudhuri | 162/168.3 |
| 3,949,014 | 4/1976 | Mahi et al. | 162/168.3 |
| 4,117,191 | 9/1978 | Kurrle | 162/181.7 |
| 4,765,867 | 8/1988 | Dreisbach et al. | 162/DIG. 4 |
| 4,927,465 | 5/1990 | Hyder et al. . | |
| 5,127,995 | 7/1992 | Wason | 162/181.8 |
| 5,149,400 | 9/1992 | Haase et al. | 162/181.6 |

FOREIGN PATENT DOCUMENTS

| | | | |
|---|---|---|---|
| 0058622 | 8/1982 | European Pat. Off. . | |
| 0144200 | 6/1985 | European Pat. Off. . | |
| 0235893 | 9/1987 | European Pat. Off. | 162/161.8 |
| 0245553 | 11/1987 | European Pat. Off. . | |
| 874759 | 9/1942 | France . | |
| 2396831 | 2/1979 | France . | |
| 61-70098 | 4/1986 | Japan | 162/181.8 |
| 05826 | 10/1986 | PCT Int'l Appl. | 162/181.6 |
| 00544 | 1/1987 | PCT Int'l Appl. . | |
| 03863 | 5/1989 | PCT Int'l Appl. | 162/181.6 |
| 06294 | 7/1989 | PCT Int'l Appl. | 162/DIG. 4 |
| 949889 | 2/1964 | United Kingdom . | |
| 1380361 | 1/1975 | United Kingdom . | |
| 1479238 | 7/1977 | United Kingdom . | |
| 2150548 | 7/1985 | United Kingdom . | |
| 800313 | 3/1980 | World Int. Prop. O. . | |

OTHER PUBLICATIONS

1004 Abstract Bulletin of the Institute of Paper Chemistry, vol. 51, Sep. 1980, No. 3, Appleton, WI. USA, Item No. 3193.
Fessenden, R. J. et al., "Organic Chemistry", Willard Grant Press. Boston, MA., 1979, p. 702.
Louchs et al., "the Role of Special Polyelectrolytes for the Solution of Operating Problems in Paper and Board Production", Nov. 7, 1985, UK Paper Industry Technical Association Northern District Meeting.

*Primary Examiner*—W. Gary Jones
*Assistant Examiner*—Todd J. Burns
*Attorney, Agent, or Firm*—Klauber & Jackson

[57] ABSTRACT

There is disclosed a process for controlling the deposition of pitch in a paper-making process, wherein there is incorporated into the paper-making composition a coated inorganic particulate material which comprises a clay mineral coated with (a) a cationic polyelectrolyte which is a water-soluble substituted polyolefin containing quaternary ammonium groups or with (b) an inorganic gel or with (c) a mixture of (a) and (b).

8 Claims, No Drawings

PITCH CONTROL USING CLAY COATED WITH AN INORGANIC GEL

This application is a continuation of application Ser. No. 373,911, filed Jun. 29, 1989, now abandoned.

This invention relates to coated inorganic particulate material suitable for incorporation in cellulose pulp compositions to reduce the adverse effects of the deposition of pitch contained therein in the manufacture of paper or board, and to a process for manufacturing paper or board.

Pitch is the name given by paper manufacturers to the substance derived from wood resins which accumulates on the wire mesh belts, or "wires", of paper making machines and on the rolls and dewatering felts. The pitch deposits are sticky and can block holes in the wire and reduce the absorptive capacity of the felt. They can pick fibres from the formed paper web, often causing holes or weak areas, and occasionally appear in the paper wet as brown lumps.

Pitch may be extracted from wood and mechanical or chemical paper pulps by means of organic solvents. The pitch consists predominantly of fatty acids, fatty esters, resin acids and unsaponifiable material such as sterols, waxes and higher alcohols. Both hardwoods and softwoods contain fatty acids, fatty acid esters and unsaponifiable materials, but only softwoods contain significant amounts of resin acids. This latter material occurs in wood mainly in the ray cells and resin canals or ducts. Softwoods or gymnosperms such as pine or spruce therefore in general cause more serious pitch problems than hardwoods such as birch, maple, oak and poplar. The softwood species Pinus Strobus L. is particularly rich in resin. The process by which the paper pulp is prepared is also important. The wood may be reduced to pulp by mechanical grinding alone or with the aid of a chemical cooking process. The two most important chemical processes are the sulphite process in which ground wood is cooked in an acid solution of calcium bisulphite saturated with sulphur dioxide, and the sulphate or Kraft process in which the cooking is performed in an alkali solution comprising caustic soda, sodium sulphide and sodium hydrosulphide. When pulp is prepared by the sulphate process the pitch problem is less severe than when the pulp is prepared by the mechanical or sulphite processes because in the sulphate process the cooking solution is alkaline and most of the pitch-forming material is removed by saponification.

Two methods are commonly used for controlling pitch in paper making. In the first method an absorbent material is introduced which will adsorb the pitch in the form of small particles, generally smaller than about 2 micrometers in diameter. Adsorbent materials commonly used for this purpose include talc and diatomaceous silica. In the second method the pitch is chemically dispersed so that it remains in suspension in process water and is removed with the waste water from the paper making process.

Our British Patent Specification No. 1375161 describes the use, as a pitch control agent in paper making, of a clay pigment which has been coated with an organic material which adheres strongly to the clay pigment and which renders the surface of the particles of the clay pigment oleophilic. Inter alia, the organic material may be an alkyl pyridinium salt or a quaternary ammonium salt and the dose rate of the organic material on the dry clay pigment is preferably in the range of from 0.5% to 5% by weight.

British Patent Specification No. 1228538 relates to kaolinites modified with inorganic gels to improve their dispersibility in organic systems.

According to one aspect of the present invention, there is provided a process for controlling the deposition of pitch in a paper-making process, wherein there is incorporated into the paper-making composition a coated inorganic particulate material which comprises a clay mineral coated with (a) a cationic polyelectrolyte which is a water-soluble substituted polyolefin containing quaternary ammonium groups or with (b) an inorganic material which adheres to the clay and which renders the surface of the particles of the clay hydrophobic or with (c) a mixture of (a) and (b).

According to another aspect of the present invention, there is provided a coated inorganic particulate material which comprises a clay mineral coated with a cationic polyelectrolyte which is a water-soluble substituted polyolefin containing quaternary ammonium groups or a mixture of such a cationic polyelectrolyte with an inorganic material which adheres to the clay and which renders the surface of the particles of the clay hydrophobic.

A cationic polyelectrolyte is believed to render the surface of the clay mineral hydrophilic.

Preferably, the clay is coated with one or other, but not both, of the cationic polyelectrolyte and inorganic material which adheres to the clay and which renders the surface of the particles of the clay hydrophobic.

The clay mineral may be of the kandite group, for example kaolinite, nacrite, dickite or halloysite and may be in its natural hydrous state or may be calcined or heat treated at a temperature and for a time sufficient to drive off some or all of its chemically bound water. Alternatively the clay mineral may be of the smectite group, for example bentonite, montmorillonite, saponite, hectorite, beidellite or fuller's earth.

Preferably the clay mineral has a particle size distribution such that the mean particle diameter is not greater than 1 micrometer and the specific surface area is at least 12 $m^2g^{-1}$.

The cationic polyelectrolyte may have quaternary ammonium groups either in the linear polymer chain or in branches of the polymer chain. The number average molecular weight of the cationic polyelectrolye is preferably in the range of from about 1500 to about 500,000 and the quantity required is generally in the range of from about 0.01% to about 1.5% by weight based on the weight of the dry clay mineral.

It has been found that advantageous results are obtained when the cationic polyelectrolyte is a poly(diallyl di(hydrogen or lower alkyl)ammonium salt) having a number average molecular weight in the range of from about 10,000 to 100,000. The lower alkyl groups which may be the same or different, may, for example, have up to four carbon atoms and are preferably methyl. The ammonium salt may be, for example, a chloride, bromide, iodide, $HSO_4^-$, $CH_3SO^-$ or nitrite. Preferably the salt is a chloride. Most preferably the cationic polyelectrolyte is poly(diallyl dimethyl ammonium chloride).

Alternatively, the cationic polyelectrolyte may be the product of copolymerising epichlorohydrin and an aliphatic secondary amine, which product has the formula:

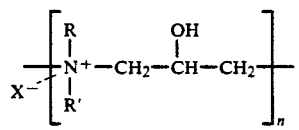

$$\left[ \begin{array}{c} R \\ | \\ -N^+ - CH_2 - CH - CH_2 - \\ | \\ R' \end{array} \begin{array}{c} OH \\ | \\ \end{array} \right]_n X^-$$

in which R and R', which may be the same or different, are each hydrogen or a lower alkyl group, preferably having from one to four carbon atoms, preferably methyl or ethyl and X is $Cl^-$, $Br^-$, $I^-$, $HSO_4^-$, $CH_3SO_4^-$ or $NO_2^-$.

The inorganic material which adheres to the clay and which renders the surface of the clay particles hydrophobic is preferably an inorganic gel, such as a magnesium silicate gel which may be prepared by the method described in British Patent Specification No. 1228538, in which the clay mineral is suspended in water and there is added to the suspension an aqueous solution of sodium metasilicate. The resultant suspension is stirred and there is then added to the stirred suspension an aqueous solution of magnesium sulphate and the suspension is again stirred. The pH of the suspension is then reduced to within the range 6 to 8 with sulphine acid and the suspension is filtered and the magnesium silicate coated clay washed twice with deionised water and thermally dried.

Other inorganic gels, however, such as aluminium silicate, aluminium hydroxide or silica may be employed but probably will not be as effective as magnesium silicate for pitch control purposes.

The clay mineral which has been coated by one of the methods described above is preferably added, in a substantially dry state, to the paper mill thin stock and the amount of the coated clay mineral added is in the range of from 0.5 to 25% by weight based on the weight of the bone dry wood fibres. The paper mill thin stock is an aqueous suspension of wood fibres which generally contains from about 0.5 to about 1.0% by weight of dry wood fibres.

The invention will now be illustrated by the following Example.

EXAMPLE

Two coated clay minerals were prepared by the following methods:

1. A calcined kaolinite which had been prepared by heating a fine kaolin clay to a temperature of 1080° C. for 30 minutes was mixed with sufficient water to form a suspension containing 45% by weight of dry calcined kaolinite and 1% by weight, based on the weight of dry calcined kaolinite of a poly (diallyl dimethyl ammonium chloride) having a number average molecular weight of about 30,000 and a cation charge density of 530 coulombs/g. The coated calcined kaolinite thus formed had a particle size distribution such that the mean particle diameter was 0.75 microns and the specific surface area was 14.1 $m^2g^{-1}$. The suspension was spray dried to produce a product in the form of dry microspheres.

2. 500 g of a fine hydrous kaolin clay was suspended in 1.5 liters of water and there was added to this suspension a solution containing 28.1 g of sodium metasilicate in water. The suspension was stirred for 10 minutes and at the end of this period the pH of the suspension was found to be 11.8. A solution containing 24.9 g of magnesium sulphate ($MgSO_4.7H_2O$) in water was then added and the suspension stirred for 15 minutes. At the end of this period the pH was found to be 9.7. The pH was reduced to 7.0 by adding a 10% solution of sulphuric acid. The suspension was then filtered and the magnesium silicate coated clay was washed twice with deionised water and dried for 16 hours at 90° C.

There was used as a control a conventional pitch control agent which was a finely ground talc having a mean particle diameter of 1.65 microns and a specific surface area of 13.6 $m^2g^{-1}$.

There was used as a further comparison a pitch control agent in accordance with British Patent Specification No. 1375161 which was prepared by coating a hydrous kaolin clay having a particle size distribution such that 55% by weight consisted of particles having an equivalent spherical diameter smaller than 2 microns with 1% by weight, based on the weight of dry kaolin, of a primary amine of formula $R.NH_2$ where R represents a mixture of alkyl groups derived from hydrogenated tellow. The mean particle diameter was 1.62 micron and the specific surface area was 6.5 $m^2g^{-1}$.

Each mineral material was mixed with water to form a suspension containing 1% by weight of the dry mineral material and to 100 g portions of this suspension were added 10 $cm^3$ portions of colloidal solutions in ethanol of a wide range of different quantities of oleic acid, which is considered to be a realistic model for the type of pitch which is found in suspension in paper making stock. In each case the mixture was shaken for 7½ minutes after which a 40 $cm^3$ sample of the suspension was centrifuged and 20 $cm^3$ of the supernatant liquid was pipetted into a vial. The water and ethanol were removed from the sample contained in the vial in a vacuum oven at 60°-80° C. and a known volume of a solution containing 0.2 mol.$dm^{-3}$ of $NaClO_4.H_2O$ in methanol was added to the vial by pipette. When the oleic acid was fully dissolved three equal consecutive injections of the resultant solution were made into a high pressure liquid chromatography column which was maintained at a temperature of 40° C., the back pressure being 16.2 MPa. For each of the three injections the area of the characteristic peak for oleic acid was measured and the mean of the three measurements calculated.

For each concentration of oleic acid in ethanol a control experiment was performed by mixing a 10 $cm^3$ portion of the oleic acid solution with 99 g of water. The resultant solution was treated in accordance with the procedure described above in connection with the samples containing the mineral material, with the exception of the centrifuging step, and the mean of three measurements of the characteristic peak for oleic acid was obtained.

From the two mean results the weight of oleic acid adsorbed by a given weight of the mineral material was calculated.

A graph was drawn for each mineral material of the weight of oleic acid adsorbed per gram of the mineral material against the concentration of oleic acid in each sample solution and it was found that the weight of oleic acid adsorbed by the mineral material increased with oleic acid concentration until a ceiling value was reached above which substantially no further increase was observed.

The following Table gives the ceiling values of the amount of oleic acid adsorbed for the three mineral materials. Also given is an approximate cost per tonne of each of the mineral materials and a value for the cost effectiveness of the mineral material in terms of the weight of oleic acid adsorbed per unit cost of the adsorbent material.

TABLE

| Mineral Material | Mean particle diameter (microns) | Specific surface area ($m^2g^{-1}$) | Oleic acid adsorbed (mol.tonne$^{-1}$) | Cost of mineral material (£.tonne$^{-1}$) | Cost effectiveness (m.mol.£$^{-1}$) |
| --- | --- | --- | --- | --- | --- |
| Cationic calcined kaolin | 0.75 | 14.1 | 300.0 | 460 | 652 |
| MgSiO₃ treated kaolin | 0.43 | 25.2 | 64.5 | 100 | 645 |
| Finely ground talc (control) | 1.65 | 13.6 | 101.2 | 250 | 405 |
| Amine treated kaolin (comparative) | 1.62 | 6.5 | 26.2 | 90 | 291 |

We claim:

1. A process for controlling the deposition of pitch in a paper-making process, wherein there is incorporated into the paper-making composition a coated inorganic particulate material which comprises a clay mineral coated with an inorganic gel which adheres to the clay and which renders the surface of the particles of clay hydrophobic.

2. A process for controlling the deposition of pitch in a paper-making process, wherein there is incorporated into the paper-making composition a coated inorganic particulate material which comprises a clay mineral coated with a magnesium silicate gel which adheres to the clay and which renders the surface of the particles of clay hydrophobic.

3. A process according to claim 1 or 2, wherein the coated clay mineral is added to a paper mill thin stock in a substantially dry state to form the paper making composition.

4. A process according to claim 1 or 2, wherein the amount of coated clay mineral added to the paper-making composition is in the range of from 0.5% to 25% by weight based on the dry weight of wood fibers in the paper mill thin stock.

5. A process according to claim 1 or 2, wherein the clay mineral is of the kandite group.

6. A process according to claim 1 or 2, wherein the clay mineral is of the smectite group.

7. A process according to claim 1 or 2, wherein the clay mineral has a particle size distribution such that the mean particle diameter is not greater than 1 micrometer.

8. A process according to claim 1 or 2, wherein the clay mineral has a specific surface area of at least 12 $m^2.g^{-1}$.

* * * * *